United States Patent
Moroney et al.

(10) Patent No.: US 9,047,804 B1
(45) Date of Patent: Jun. 2, 2015

(54) LEXICAL-BASED PROCESSING OF COLOR IMAGES

(75) Inventors: Nathan M. Moroney, Palo Alto, CA (US); Ingeborg Tastl, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 447 days.

(21) Appl. No.: 11/615,035

(22) Filed: Dec. 22, 2006

(51) Int. Cl.
  *G09G 5/06* (2006.01)
  *G06Q 10/06* (2012.01)
  *G06T 7/40* (2006.01)
  *G06F 17/30* (2006.01)

(52) U.S. Cl.
  CPC ............... *G09G 5/06* (2013.01); *G06Q 10/063* (2013.01); *G06T 7/408* (2013.01); *G06F 17/3025* (2013.01)

(58) Field of Classification Search
  USPC .................................................. 345/595, 596
  See application file for complete search history.

(56) References Cited

U.S. PATENT DOCUMENTS 5,218,671 A * 6/1993 Liao et al. ...................... 345/595
7,415,153 B2 * 8/2008 Mojsilovic ..................... 382/162

OTHER PUBLICATIONS

Walsh, Kevin J., "RGB to Color Name Mapping (Triplet and Hex)" http://web.njit.edu/~kevin/rgb.txt.html#copying. Copyright © 1996, 1999, 2001, 2004, 2005, 2006, 2007, 2008 Kevin J. Walsh. Date accessed Mar. 9, 2009.*

"The World Color Survey Database: History and Use" R.S. Cook, P. Kay, and T. Regier Handbook of Categorisation in the Cognitive Sciences, H. Cohen and C. Lefebvre, eds., pp. 224-242, Elsevier 2005 Date accessed: Aug. 21, 2009 via web (http://www.icsi.berkeley.edu/~kay/claire7.pdf.*

Morton, J.L. ("Color Matters—Global Color Survey" Updated Oct. 7, 2006. Date accessed: Dec. 14, 2009 via web (Internet Archive url: http://web.archive.org/web/20061007000337/http://express.colormatters.com/colorsurvey/)).*

Benavente, R., Vanrell, M. and Baldrich, R. (Feb. 2006), A data set for fuzzy colour naming. Color Research & Application, 31: 48-56. doi: 10.1002/col.20172. Accessed online via: http://cat.uab.cat/Publications/2006/BVB06/CRA2006_preprint_web.pdf.*

Alvarado, N. & Jameson, K.A. (2002). The use of modifying terms in the naming and categorization of color appearances in Vietnamese and English. Journal of Cognition and Culture, 2.1, 53-80.*

H. Lin et al., "A cross-cultural colour-naming study, Part III—A colour naming model" Color Research and Application, vol. 26, No. 4 (2001).

N. Moroney, "Unconstrained web-based color naming experiment", Proc. SPIE 5008, pp. 36-46 (2003).

* cited by examiner

*Primary Examiner* — Antonio A Caschera
(74) *Attorney, Agent, or Firm* — Hugh Gortler

(57) ABSTRACT

Processing of a digital image includes using a machine to convert numerical representations of colors in the digital image to lexical representations of the colors. The lexical representations may be used for image processing such as color reproduction. Examples of lexical-based color reproduction include, without limitation, using the lexical representations to perform color correction of an image display device, identifying potential problems with color shifts, generating statistics about lexical boundary crossings, and developing image processing pipelines.

16 Claims, 9 Drawing Sheets

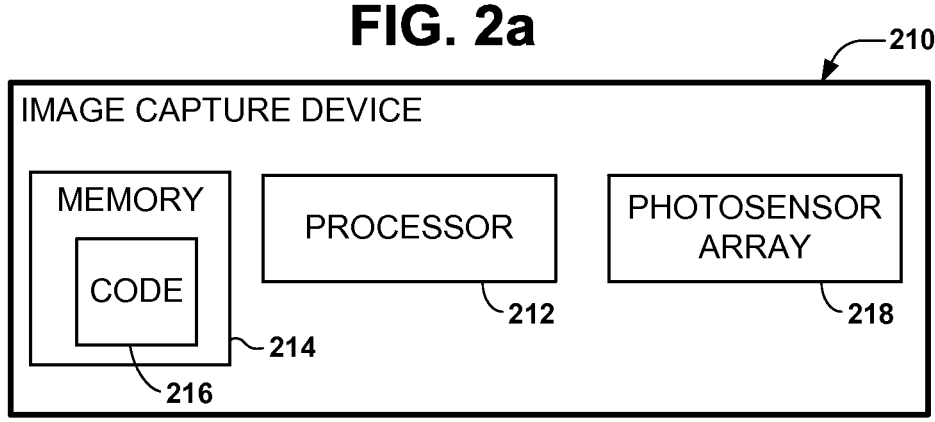
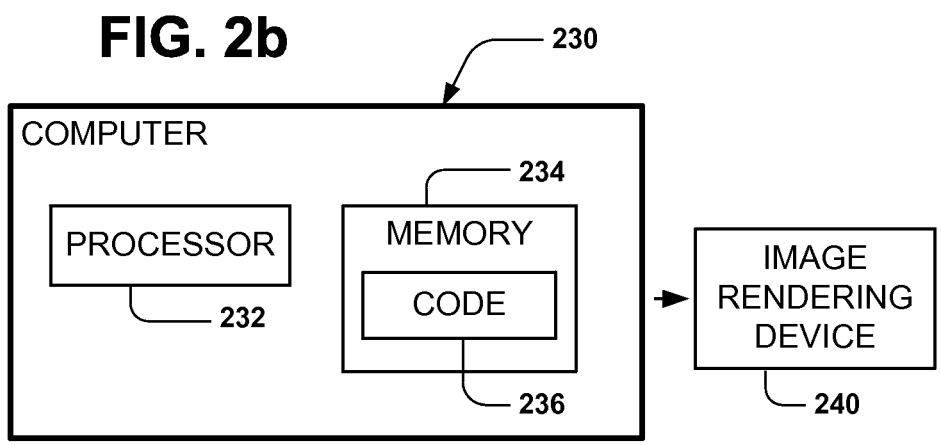
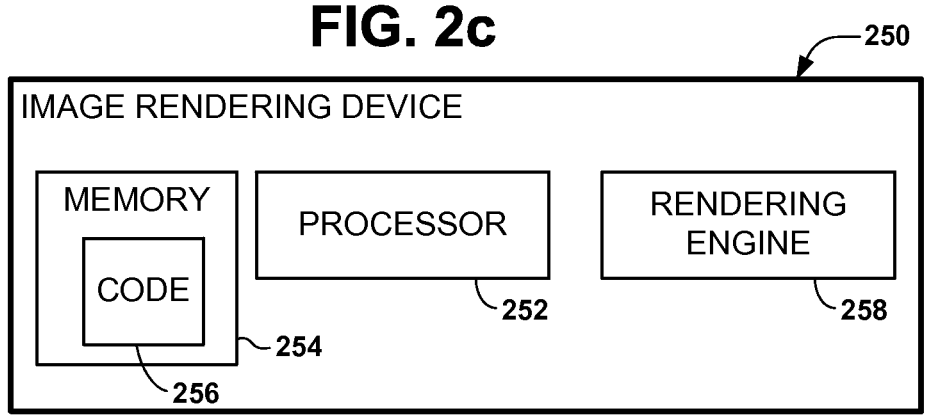

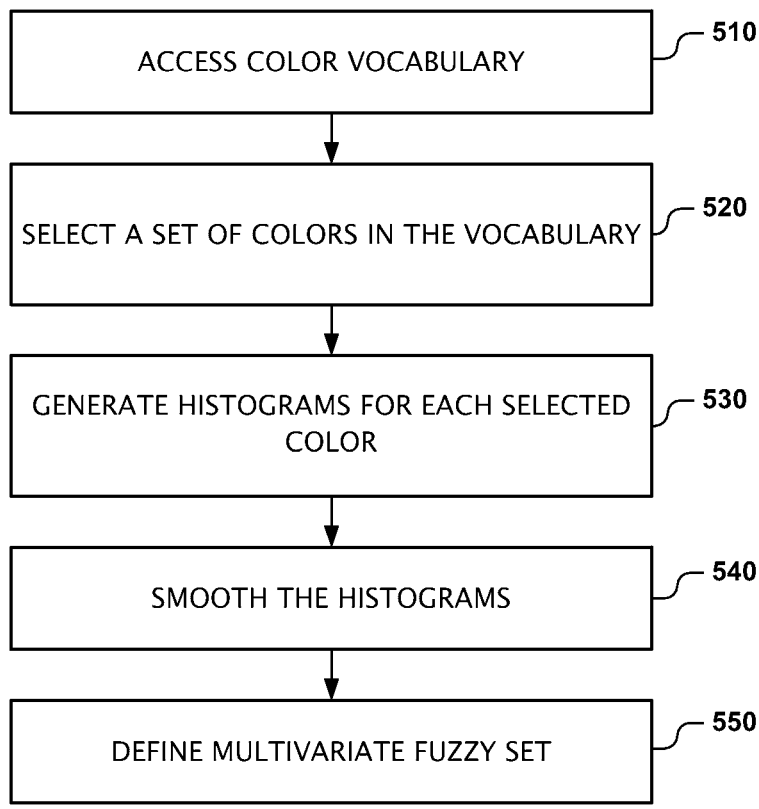
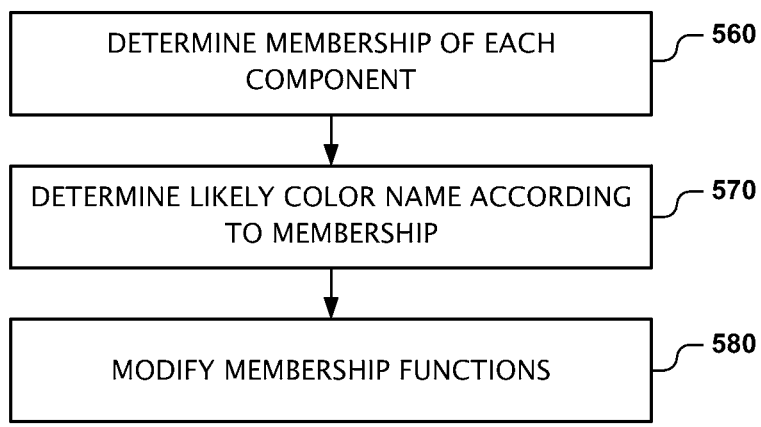

FIG. 5b
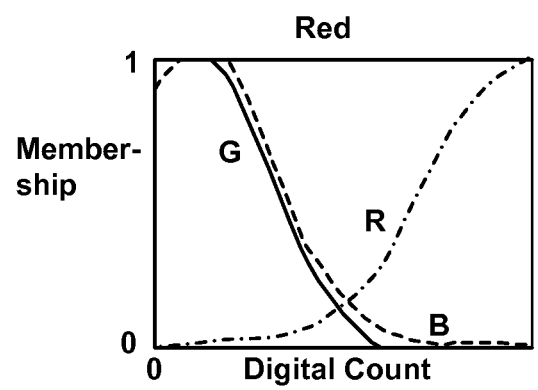
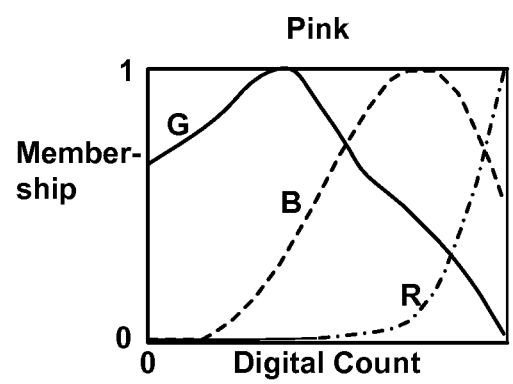
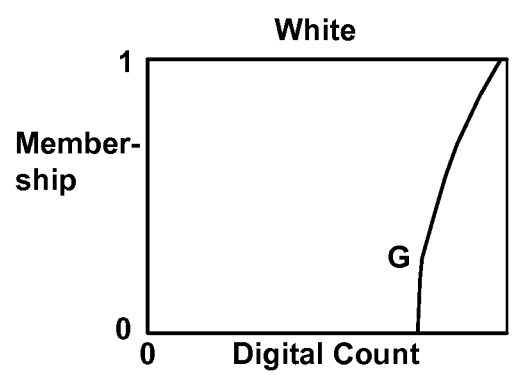

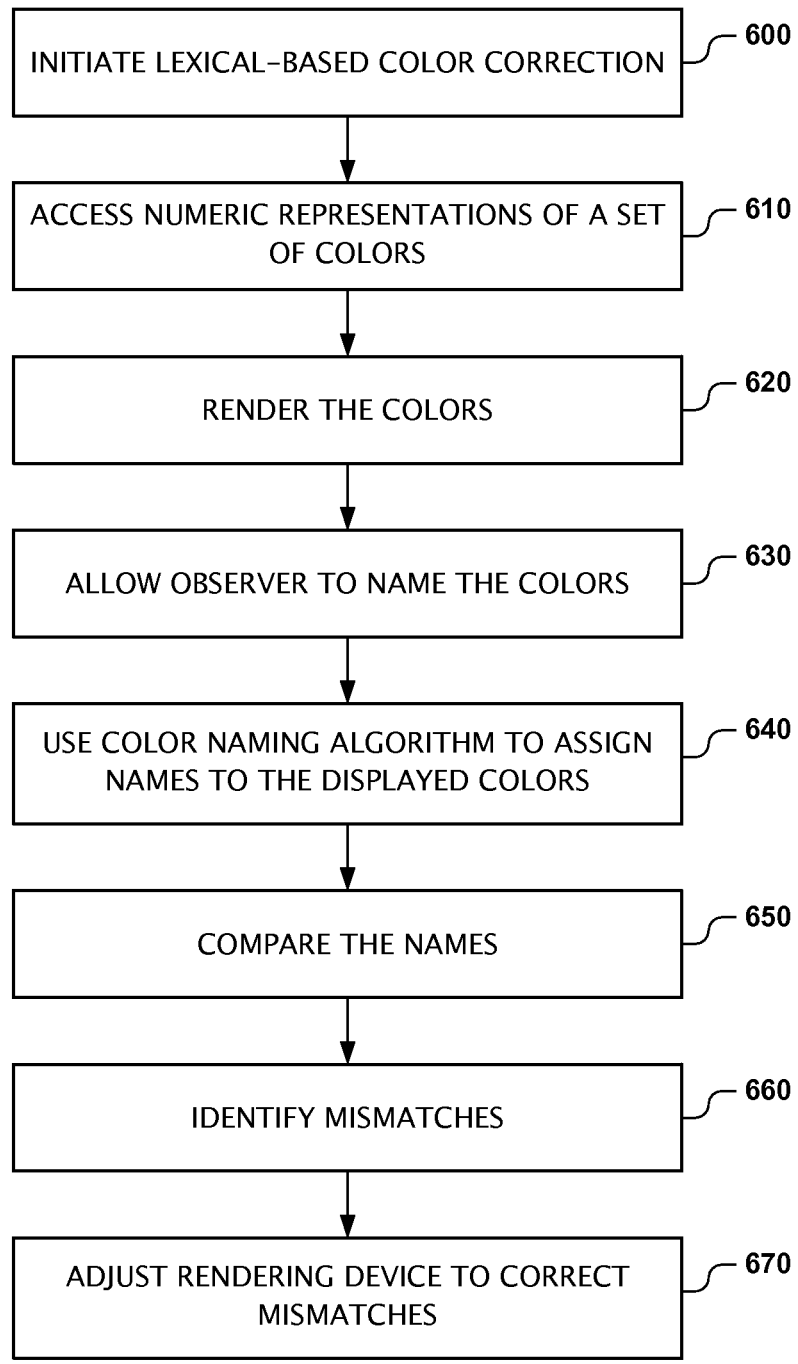

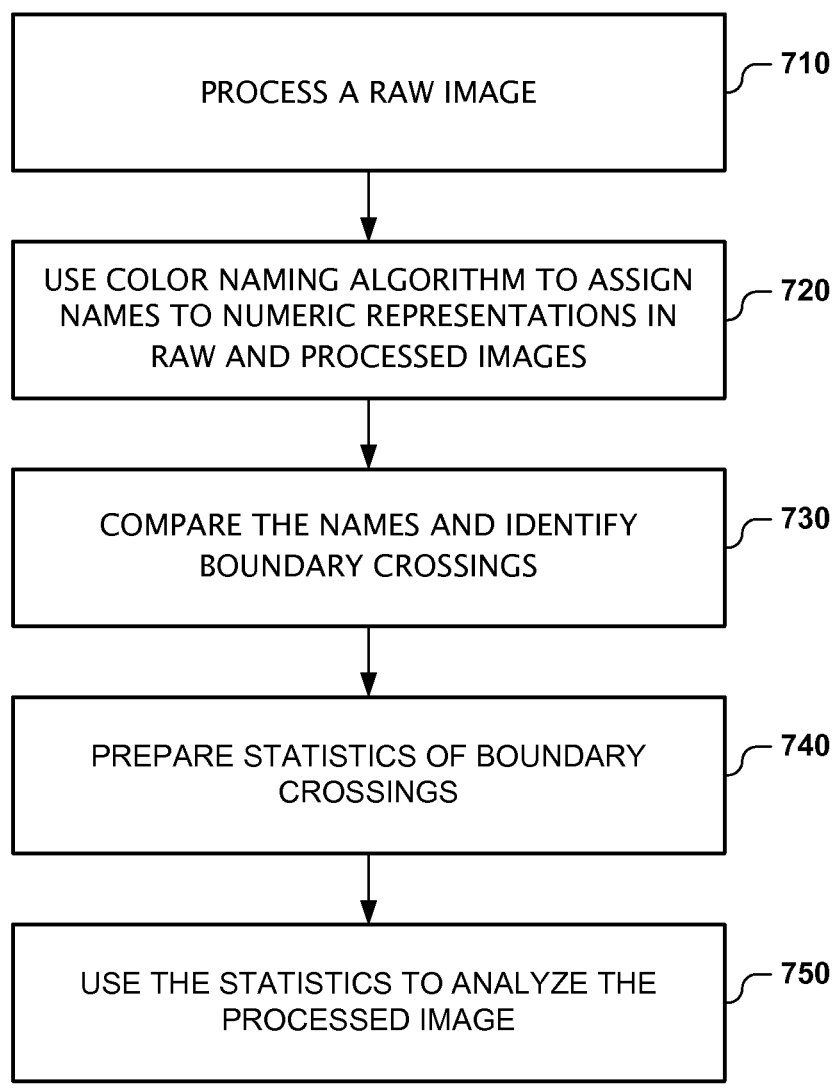

LEXICAL-BASED PROCESSING OF COLOR IMAGES

BACKGROUND

In color image encoding and processing, digital images are represented by a quantized set of coordinates in n-dimensional space. For example, each pixel of an RGB image may be represented by a triplet of numeric values: a first numeric value indicating the intensity of a red component, a second numeric value indicating the intensity of a green component, and a third numeric value indicating the intensity of a blue component.

SUMMARY

According to one aspect of the present invention, processing of a digital image includes using a machine to convert numerical representations of colors in the digital image to lexical representations of the colors.

According to other aspects of the present invention, the lexical representations may used for image processing such as color reproduction. Examples of color reproduction include, without limitation, using the lexical representations to perform color correction of an image display device, identifying potential problems with color shifts, generating statistics about lexical boundary crossings, and developing image processing pipelines.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIGS. 2a, 2b and 2c are illustrations of machines in accordance with embodiments of the present invention.

FIG. 5a is an illustration of a method of generating fuzzy memberships in accordance with an embodiment of the present invention.

FIG. 5b is an illustration of exemplary color boundaries for fuzzy memberships.

FIG. 5c is an illustration of a color naming algorithm in accordance with an embodiment of the present invention.

FIGS. 6-8 are illustrations of color reproduction methods in accordance with embodiments of the present invention.

DETAILED DESCRIPTION

Figure 1:
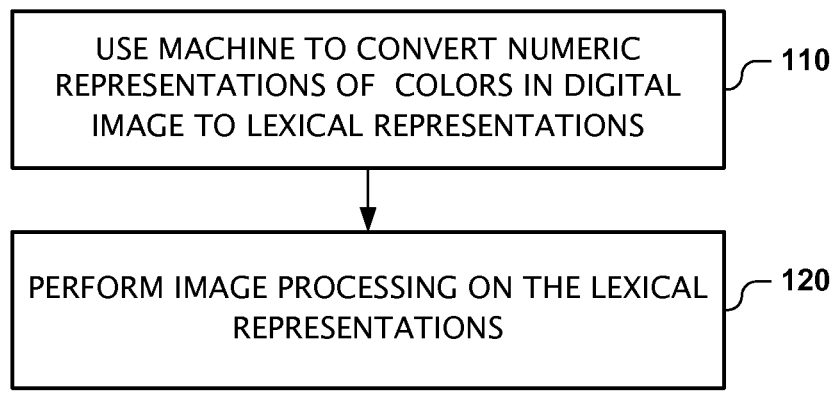
FIG. 1 is an illustration of image processing in accordance with an embodiment of the present invention.

Reference is made to FIG. 1. A machine is used to convert numeric representations of color images to lexical (name-based) representations of colors (block 110). An example of a numeric representation of a pixel having three color components (e.g., RGB, YUV) is the triplet {200, 10, 25}. Examples of lexical representations of pixels include the color names Blue, Reddish Brown, Turquoise, and Green. The lexical representations may be encoded as text strings, numeric strings, or some other form.

The machine may pick a color name from a vocabulary. In some embodiments, the machine can synthesize a color name from the vocabulary. The vocabulary contains the available color names.

The number of available color names is orders of magnitudes less than the number of available colors in a digital image. For example, 24-bit words can describe roughly 16.7 million colors, whereas the number of color names in a lexical representation might be 100.

Lexical representations reduce the higher bit-depth color information to highly salient cognitive nodes and, as a result, yield a considerably improved result relative to quantization. Lexical representations are also more broadly applicable than color palettes. Whereas color palettes are image-specific, the lexical representations can be applied to different images. For example, the lexical representations can be used in image processing such as color reproduction (block 120).

Reference is made to FIGS. 2a-2c, which illustrate machines 210, 230 and 250 that can access numeric representations of digital images and convert the numeric representations to lexical representations. These machines 210, 230 and 250 will be described in detail below. In general, however, each machine 210, 230 and 250 includes a processor 212, 232, 252 and memory 214, 234, 254 that stores code 216, 236, 256. The code 216, 236, 256 includes a color naming algorithm that, when executed, instructs the processor 212, 232, 252 to convert numerical representations of colors to lexical representations.

A code naming algorithm according to the present invention is not limited to any particular type of methodology. Possible types include, but are not limited to, classical logic, neural networks, Bayesian learning, centroids, and fuzzy logic. Several of these types will now be described in detail.

Color Naming Algorithm Based on Classical Logic

In a color naming algorithm based on classical logic, RGB values are compared to a set of threshold values, and a color name is determined from the comparisons. Thresholds for lightness, chroma and hue (LCH space) are preferred. LCH is a polar form of CIELAB. However, thresholds for other color spaces may be used.

Figure 3:
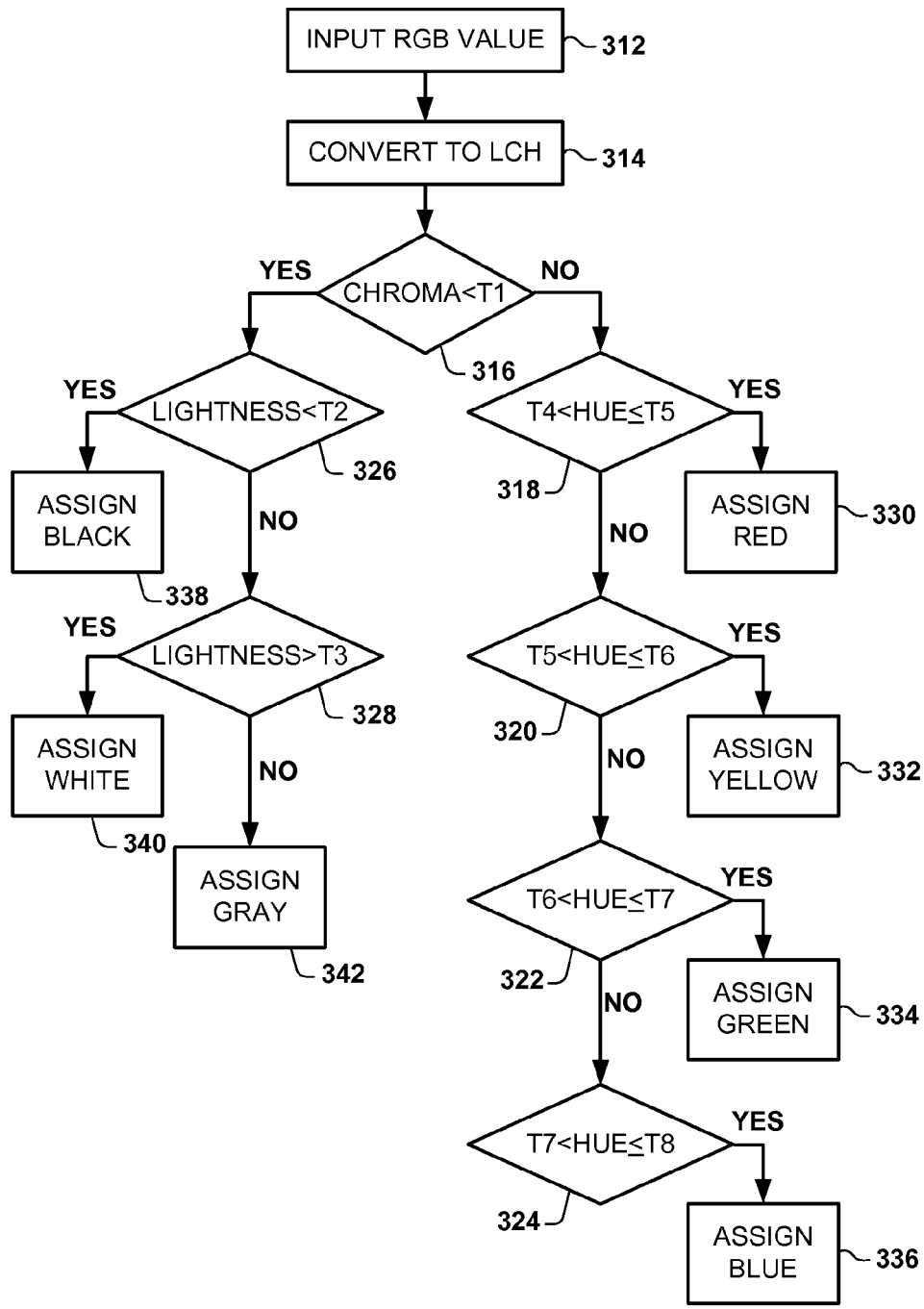
FIG. 3 is an illustration of a color naming algorithm in accordance with an embodiment of the present invention.

Reference is now made to FIG. 3, which illustrates a simple example of a color naming algorithm based on classical logic. An RGB value is inputted at block 312, and then converted to lightness, chroma and hue values (LCH) at block 314. For example, the RGB value may be converted to a CIELAB value, and then converted to an LCH value.

The LCH values are compared to specific threshold values T1 through T8 at blocks 316-328. The first comparison (at block 316) indicates whether the input value is achromatic. The remaining comparisons (at blocks 318-328) cause a color name to be assigned (blocks 330-342). Hue is an angular quantity, and thresholds t8 and t4 should be coincident. In this example, the color vocabulary consists of the names Black, White, Gray, Red, Green, Yellow and Blue. This example can be scaled to larger color vocabularies and a larger number of thresholds.

In this example, the thresholds T1-T8 are fixed. As a consequence, color names cannot be added to the vocabulary. If the classical algorithm defines only seven color names, then only one of those seven color names can be assigned to each input value.

Another consequence of fixed thresholds is that boundaries of the colors cannot be changed. That is, identical input values will necessarily be assigned the same color name. Thus, this example of the classical model considers only fixed boundaries, and not other considerations such as the location of color name centroids or the fuzziness of boundaries.

Color Naming Algorithm Based on Centroids

A color naming algorithm based on centroids (also referred to as prototypes) emphasizes the location of the foci or centroids of the different colors. Centroid theory hypothesizes that people learn a single, best focal color for a given color name. The relative similarities to a set of learned centroids are then used to categorize a given example color. This corresponds to a nearest neighbor calculation and effectively results in a Voronoi partitioning of a color space.

The color names can be assigned according to overall frequency analysis, custom considerations, or a combination of the two. The centroid for each name can be computed using basic statistics (e.g., the arithmetic mean in RGB space). For example, a color naming database (described below) can be generated by asking many (e.g., several thousand) participants to assign names to a set of random colors. The mean of a given color name may be computed by extracting all exact matches of the given name from the database, summing the individual color components, and then dividing the sum by the number of times that the given name is used.

Figure 4A:
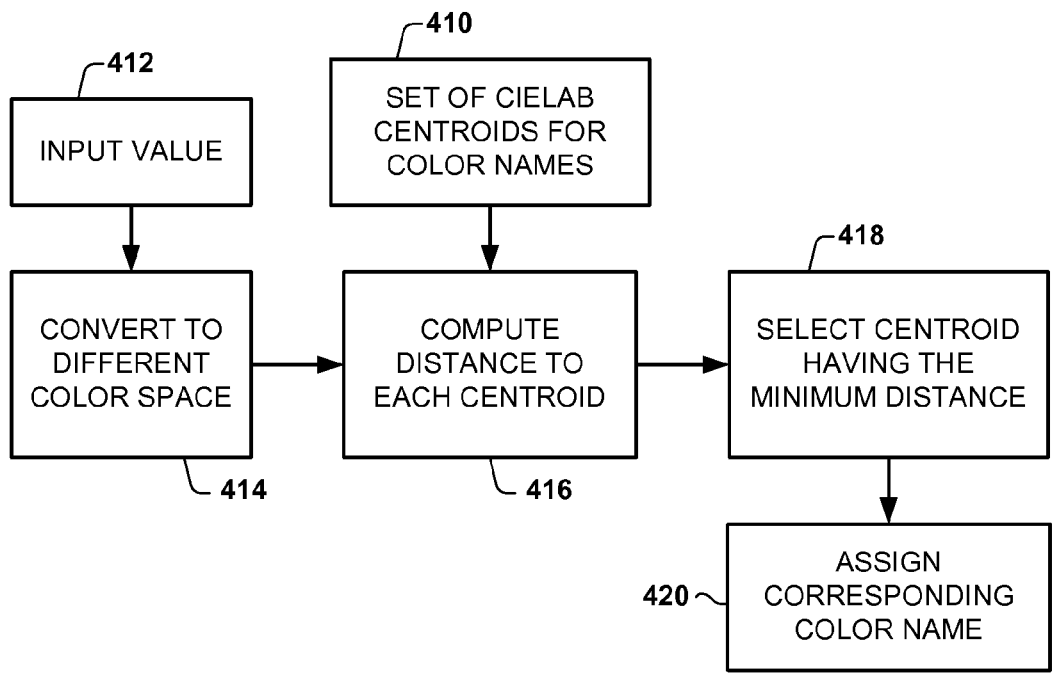
FIG. 4a is an illustration of a color naming algorithm in accordance with an embodiment of the present invention.

Reference is now made to FIG. 4, which illustrates an example of an algorithm that uses centroids to assign color names. The algorithm may use a pre-selected set of centroids 410. The color names that are selected for the set may be specific to the goal of the image processing. Fewer centroids result in a more abstract image. In some instances, the color space might be partitioned into large regions to produce an image that is very abstract-looking. A small number of centroids, such as the eleven basic color names, might be appropriate. In other instances, the color space might be partitioned into small regions to produce a more photographic-looking image. A larger number of color names, such as twenty-five, might be appropriate.

A value is inputted (block 412) and optionally converted (block 414) to a color space such as CIELAB, YCC, CIELUV, or CIECAM02. At block 416, distance from the value to each centroid is computed. At block 418, the centroid having the shortest distance is selected. At block 420, the color name of the selected centroid is assigned to the input value.

As a simple example, consider a vocabulary of two color names: black and white. The CIELAB centroid for white is {100, 0, 0} and for black is {0, 0, 0}. If the input CIELAB value is {98, −14, 50} (pale yellow), the distance to the white centroid is approximately 51.9 and the distance to black centroid is approximately 110.9. Since the distance to the white centroid is shortest, the input value is assigned the name White. This simple example can be expanded to a larger number of color names, various color spaces and various distance calculations, such as weighted distances.

Figure 4B:
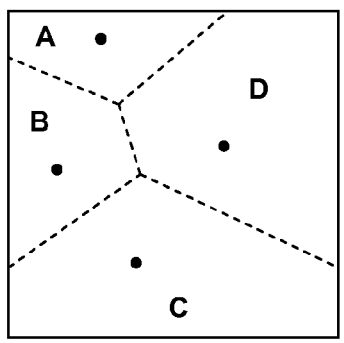
FIGS. 4b and 4c are illustrations of exemplary color boundaries for a color naming algorithm that is based on centroids.

The color naming algorithm based on centroids tends to produce boundaries with distinct corners or large straight edges between colors. The partitioning of color space is simple and geometrically straightforward. A simple example of such boundaries is illustrated in FIG. 4b. In this simple example, four color boundaries of regions A, B, C and D are indicated by dashed lines. Geometric centroids of these results are represented as points.

The boundaries are implicitly defined by the location of the centroids. They result from a Voronoi partitioning of the color space. The boundaries establish the domains of the color name and are relevant when desirable to expand or contract the domains over which specific color names are assigned. For instance, for the non-photographic rendering of images, it might be appropriate to expand the domain of colors assigned to the "flesh" color name.

The color naming algorithm based on centroids allows the boundaries to be changed. Boundaries can be changed by changing the geometry of a centroid. For example, a centroid can be changed from a point to a line, curve, region or volume (or vice versa). Changing the centroid geometry of a color name will change the number of colors assigned to that color name. To increase the number of color names, new centroids are added.

Figure 4C:
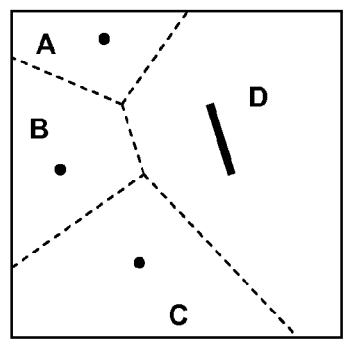

Consider the example illustrated in FIG. 4c. The region labeled D is expanded by changing its centroid from a point to a line.

Color Naming Algorithm Based on Fuzzy Logic

FIGS. 5a-5c illustrate a color naming algorithm based on fuzzy logic. Fuzzy logic emphasizes the concept of graded memberships. Fuzzy set theory allows the concept of partial membership defined via a membership function $\mu_A(x)$ that can take on values in the interval [0,1].

Each color name is treated as a fuzzy set. A point in n-dimensional color space can be a member of several color names (e.g., Orange, Red, Brown) at the same time, but in different strengths. The color naming algorithm can map 3-dimensional scalar values of a color space into a much smaller set of 3-dimensional scalar values representing the color names of the vocabulary.

Reference is made to FIG. 5a, which illustrates an exemplary method of generating membership functions a code naming algorithm based on a fuzzy logic model. A color vocabulary is accessed (block 510). For example, the vocabulary may be accessed from a color naming database. Generation of the color naming database is described below.

A set of the colors in the color vocabulary is selected (block 520). The specific colors can be selected according to several factors. Based on a factor such relative frequency, the most commonly used names would be used first. As another factor, application-specific names may be chosen. For example, a flesh-tone color may be selected for imaging applications.

Three one-dimensional histograms are generated for each selected color (block 530). The histograms show the frequency of the occurrence of that color name for a particular triplet.

The histograms can be smoothed (block 540). Smoothing may be performed if the input domain is quantized, or the data is undersampled.

Using the histograms, a multivariate fuzzy set can be defined with a membership function (block 550). For example, the multivariate fuzzy set Pink={Pink(R), Pink(G), Pink(B)} can be defined with the following membership function:

$$\mu_{Pink}(x) = \mu_{Pink(R)}(x1)\mu_{Pink(G)}(x2)\mu_{Pink(B)}(x3),$$

where x1, x2 and x3 are scalar values of a color. For instance, scalar values x1, x2 and x3 could represent red, green and blue values. Or, values x1, x2 and x3 could represent values in another color space, such as YCC or CIELAB LCh.

Unlike, traditional fuzzy logic applications, where membership functions are based on assumptions and are tuned in order to get a desired output, the fuzzy logic for the color naming algorithm is strictly based on the collected data.

FIG. 5b shows exemplary membership functions for red, pink and white for a digital count on the x-axis and the unitary normalized membership values for the red (R), green (G) and blue (B) channels on the y-axis. These membership functions are relatively smooth, single-peaked and gradually transitioning from full membership to non-membership. The functions can be rather broad as in the example of the green membership of pink or quite restrictive as in white and all three examples are non-symmetrical.

The gradual transitioning from full to partial membership provides a more nuanced description of the corresponding color name boundaries. As a result, color name boundaries can be more complex than straight boundaries, which allows for better boundary modeling. For instance, certain color names boundaries might be better modeled with curved boundaries instead of straight boundaries.

Reference is made to FIG. 5c, which illustrates a method of using a color naming algorithm based on fuzzy logic. For each input value, the algorithm determines membership of each color component (block 560). For instance, the algorithm determines a membership degree (a scalar value between 0 and 1) for each color name in the vocabulary.

The color naming algorithm determines the likely color based on the component memberships (block 570). The sets of the individual names can be combined into one set. Using a maximum operator, for example, the final color name, which gets assigned to the specific pixel is the name, where the degree of membership was the strongest or highest.

The final color name can be modified by modifying the membership functions (block 580). The membership functions can be made narrower or broader by applying a power function. For example, an exponential function can be applied to the normalized membership functions, which will result in an expansion of the color name region if the exponent is positive, but less than one and in a reduction if the exponent is greater than one.

Lexically, this modification may be expressed as a linguistic hedge or modifier. A linguistic hedge or modifier plays the same role as adjectives or adverbs in different languages. Yet another variation would generate modifiers such as "-ish" and connect them directly with a specific modification of the membership function.

Modifying the membership functions (block 580) can increase the versatility and usability of a color naming algorithm based on fuzzy logic. A color name is obtained by applying a default set of membership functions (blocks 560-570), and the membership functions are modified to obtain predictable modifications. The modifications can be made by a user or by an automated system and they can also be connected back to modifications of the color names themselves. For example, a graphical user interface provides sliders that allow membership functions to be modified. A user can at first perform a lexical quantization based on the default membership functions, but then fine tune the results by modifying the membership functions with the sliders.

Color Naming Database

Figure 9:
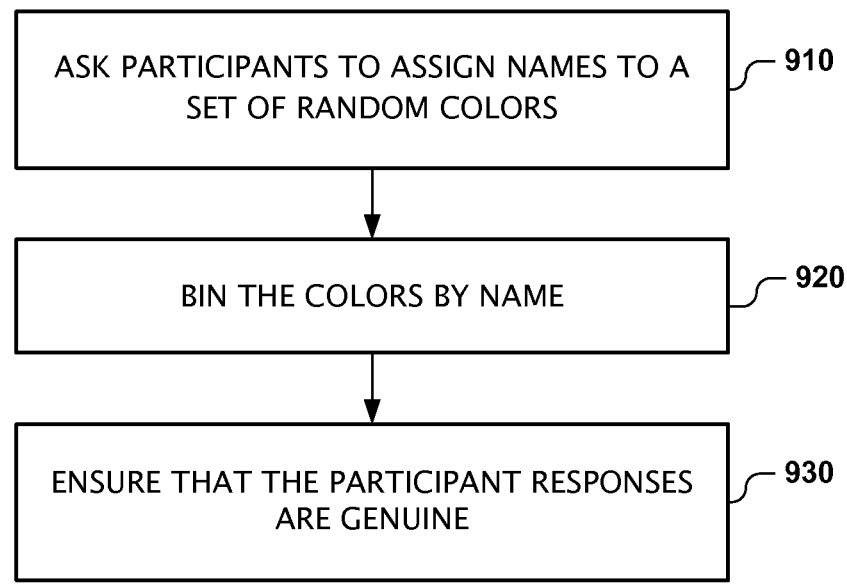
FIG. 9 is an illustration of a method of generating a color naming database in accordance with an embodiment of the present invention.

Reference is made to FIG. 9. A color vocabulary may be defined by a color naming database. The color naming database can be generated by asking many (e.g., several thousand) participants to assign names to a set of random colors (block 910). The participants can be selected from different locations (e.g., different companies, states, countries, continents). The colors can be binned by name (block 920). Measures can be taken to ensure that the participant responses are genuine (block 930). The results can be correlated against published laboratory studies. See, for example, N. Moroney, "Unconstrained web-based color naming experiment", Proc. SPIE 5008, pp. 36-46 (2003).

Image Processing of Lexical Representations

Figure 8:
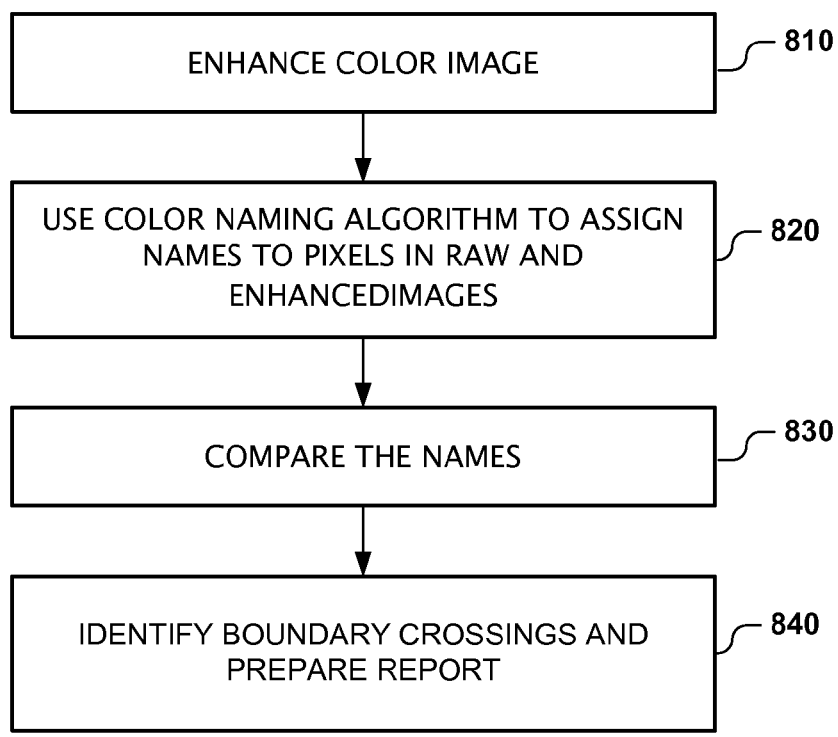

The image processing is not limited to any particular type. Several examples of color reproduction are illustrated in FIGS. 6-8.

Color Correction

FIG. 6 illustrates a method of using lexical representations to perform color correction in an image rendering device such as a digital projector, video display, digital television or printer. For instance, CRT displays operated under extreme conditions can behave differently than a standard sRGB display. LCD displays can vary over a much broader range of operating conditions. Digital projectors can be so far away from a standard sRGB display, that different users would use divergent color names to describe the projected colors. The lexical-based color correction can bring image rendering devices closer to a standard sRGB display.

Referring to FIG. 6, the lexical-based color correction is initiated (block 600). The color correction may be initiated internally (e.g., automatically by a machine) or externally (e.g., by a user).

Numeric representations of a set of colors are accessed (block 610). The selection of colors in the set may be based on a tradeoff of relative accuracy versus overall time to perform the color correction. For instance a quick and coarse display adjustment may make use of the basic eleven color names while a more comprehensive color correction may make use of more names (e.g., twenty names). The color names may be selected such that the most commonly used color names would be included in the set and infrequently used color names would not be used in the set.

The image rendering device renders the color set (block 620) and an observer names the displayed colors (630). The observer may be a person or a machine (e.g., a color measurement device). As a first example, a digital television or video display displays each of the colors in the set (sequentially or simultaneously). A list of colors is also displayed. A user selects a color name from the list for each displayed color.

As a second example, a printer prints out a sheet of color patches. A user then inputs (e.g., via the printer's display panel) a color name for each color patch on the sheet.

A color naming algorithm is used to assign color names to the numeric representations of the colors in the set (block 640). The assignment could be made by the image rendering device or by another machine (e.g., a computer).

The observer-generated names are compared to the algorithm-assigned names (block 650). This too could be performed by the image rendering device or by another machine.

Mismatches between the observer-assigned names and the algorithm-assigned names are identified (block 660). A mismatch might identify a color shift and a direction of the shift. For example, the mismatch could identify a color shift, such as an orange tint, in a projector. These mismatches could be identified by the image rendering device or by another machine.

The image rendering device is adjusted to correct the mismatches (block 670). As a first example, a correction table containing a set of tone curves could be applied to an image prior to rendering it. The correction table could be applied by the image rendering device or it could be applied to the image before the image is sent to the image rendering device. The correction table could be a specific internal data structure in the display processing pipeline.

As a second example, a correction table containing a display profile can be applied to an image prior to rendering it. This multi-dimensional interpolation table could be selected from a set of pre-computed profiles or it could be computed dynamically based on a parameterized model of the display.

Accessing the set of colors to be displayed (block 610) and allowing an observer to name the colors (block 630) can be performed in a variety of ways. The colors could be selected and named by a user. As a first example, a user could be shown one or several images and asked to select areas in the image (e.g., with a mouse) and provide a verbal color description. As a second example, a set of patches could be displayed, and the user could be asked to name the displayed patches.

The colors could be pre-selected (e.g., during manufacture of the image rendering device) and stored in a hardware or software table of the image rendering device table. The colors may be accessed by reading the hardware or software table. As a first example, the colors may be selected from a profile that is compliant with a standardized specification (e.g., the ICC specification) or it may be compliant with a proprietary format.

As a second example, the colors might be selected according to the behavior of the image rendering device or the environment in which an image will be rendered. Consider a projector. When an image is projected onto a screen, the projected colors could differ due to specific colors filters used in the projector, they could differ due to "colored" room light, etc. The set of colors could include specific colors that help identify such color shifts.

The lexical-based color correction provides coarse calibration for the worst errors in color reproduction. Coarse calibration might be sufficient in many cases. If only coarse calibration is desired, a software implementation of the lexical-based color correction can replace specialized color measurement hardware.

Quantitative Image Analysis

FIGS. 7 and 8 illustrate methods of using lexical representations to make a quantitative analysis of a processed image.

Referring to FIG. 7, a raw image is processed (block 710). Processing of the image is platform-dependent and is not limited to any single algorithm or combination of algorithms. For example, a processing pipeline of a digital camera may perform tone mapping, color balancing, device-to-device conversion, adaptive lighting, and digital flash. Other color-enabled devices (e.g., other digital cameras, scanners, all-in-one machines) could have different processing pipelines.

A color naming algorithm is used to assign color names to numerical representations in the processed and raw images (block 720). A single machine or separate machines may be used to process the raw image and assign the color names.

The assigned colors in the processed and raw images are compared, and the locations of boundary crossings are identified and recorded (block 730). A boundary crossing refers to a mismatch between named colors in the raw and processed images. Consider a color set in which brown and reddish brown are adjacent. If a pixel of the raw image is assigned a brown color, and the corresponding pixel in the processed image is assigned a reddish brown color, then a boundary is crossed at that pixel.

Moreover, the number of boundaries crossed can be recorded for each boundary crossing. For example, if the mismatch is between adjacent colors (e.g., brown and reddish brown), then only a single boundary has been crossed. If the mismatch is between two colors that are separated by a single color, then two boundaries have been crossed.

Statistics of the boundary crossing are prepared (block 740). For example, a histogram can identify the number of pixels that cross zero boundaries, one boundary, two boundaries, and so on.

The statistics are used to analyze the processed image (block 750). In some embodiments, the statistics can be used for analysis of a color table that is used for color correction. For example, a color table is deemed acceptable if the ratio of pixels crossing one boundary to pixels crossing zero boundaries is less than 5%.

The statistics can be used to identify artifacts arising from image enhancement. Whenever color descriptions are changed from one color space to another (e.g., from RGB to CMYK, from one RGB space to another RGB space), the statistics can be used to identify perceivable color change. When used as a development tool, the statistical analysis increases accuracy, efficiency and productivity, since there is less need for a human observer to build many different color tables for a device and visually evaluate the color tables and check for artifacts.

In other embodiments, the statistics can be used to determine whether enhancements to a raw image are acceptable. If the statistics indicate that the enhancements are not acceptable, the enhancements would not be applied to the raw image.

In other embodiments, the statistics can be used to evaluate one or more processing pipelines. For example, a raw image is processed by a pipeline that includes a family of image processing algorithms. A raw image goes through the processing pipeline, color names are assigned to the raw and processed images, boundary crossings are identified and recorded, and statistics are prepared from the boundary crossings. The pipeline is evaluated according to the statistics.

In other embodiments, different processing pipelines having different families of algorithms are evaluated during the development of a machine. A raw image is sent to each of the processing pipelines, and a processed image is produced by each pipeline. Color names are assigned to the raw image and to each of the processed images. Boundary crossings are identified and recorded for each processed image, and statistics are prepared from the boundary crossings. Statistics are then generated for other raw images. The statistics could be used to identify all suitable pipelines, and it could even be used to select the "best" pipeline.

Referring to FIG. 8, a machine is used to enhance a color image (block 810). For example, a photo editing program on a personal computer is used to perform color correction on a document, or a digital camera automatically performs image enhancement on a captured image.

After the image has been enhanced, the machine assigns color names to pixels in the enhanced and raw images (block 820). The numeric-to-lexical conversion can be part of the processing pipeline of a digital camera, it can be a tool in a photo editing program, etc.

The named colors in the processed and raw images are compared pixel-by-pixel (block 830), and the locations of boundary crossings are identified and reported to the user (840). The boundary crossings may be reported in the form of a warning image. The warning image can identify pixels that cross one or more boundaries. The warning image can identify regions containing pixels that cross one or more boundaries. The boundary crossings can be visualized with a mask, which encodes the strength of the mismatches (i.e., the number of boundaries crossed at each pixel).

The boundary crossings could be reported in other ways. For example, a statistical summary, histogram or other data visualization scheme could be used to report the relative amounts and locations of the mismatches.

The warning image could be displayed by an end-user or developer to identify potential problems with color shifts due to modifications performed by the system or the user (e.g., applying ICC profiles coming from various sources). The warning image could be used to assess the quality of a color table or an ICC profile, in particular if perceptual re-rendering methods are used.

The method of FIG. 8 can also be used to develop meaningful color tolerances for "allowed modifications" throughout a color space. For example, tone curves could be applied on a channel-by-channel basis to an RGB image. If the user wanted to edit the image without having "browns" shift to "olive greens" then there would be a limit as to how far the green tone curve could be modified independently of the red tone curve. The editing could be constrained to avoid crossing naming boundaries. The method can also identify colors that can be modified without causing boundary crossings.

The methods of FIGS. 7 and 8 are not limited to any particular implementation or platform. Either method can be part of a software package that generates and evaluates color profiles, part of a processing pipeline of an image capture or image rendering device, a standalone program, a tool in an image editing program, a web browser plug-in, a plug-in to other image processing algorithms, etc. Either method could be could be applied automatically, whenever an image is enhanced, whenever a transformation is performed from one color space to another, etc.

The statistics and reports of FIGS. 7 and 8 assess color errors in terms of the numbers and locations of color name shifts that results from the image processing. This approach is more intuitive and offers a high level description of the processing errors. Even non-color specialists can interpret the results and understand the resulting errors.

A method according to the present invention is scalable if the number of colors in the set can be varied. Varying the colors would allow for different granularities in different parts of the color space. It has been observed that color names are not just uniformly scattered throughout color space. For instance, there tends to be more names for yellowish reds than yellowish greens. Granularity control could be used to test specific colors.

Color image processing according to the present invention is not limited to the embodiments just described. Color image processing according to another embodiment of the present invention might involve identifying a specific color in an image (e.g., the color name that most closely approximates a company logo color). The granularity could be controlled to refine the color name.

Color image processing according to another embodiment example of the present invention might involve non-photographic rendering. A color image is converted to its lexical representations, and the lexical representations are converted back to numeric representations. Consequently, the number of available colors is reduced from 2N (over 16 million for an N=24 bit word) to the number of colors in the set. If a natural image is processed and displayed in this manner, it will have a "paint by numbers" appearance relative to the raw image.

Color Image processing according to yet another embodiment of the present invention involves a color picker that is based on lexical-to-numeric conversion. A computer displays a text box for picking a color, and a user types a color name into the text box. The color picker returns a corresponding RGB value as well as a colored swatch.

Hardware Implementations

A method according to the present invention is not limited to any particular hardware platform. Exemplary machines are illustrated in FIGS. 2a-2c.

Reference is once again made to FIG. 2a, which illustrates an image capture device 210. The image capture device 210 may access a digital image by generating it using a photosensor array 218, a processor 212 and memory 214. The image capture device 210 can then convert the captured image to a lexical representation, and process the lexical representation on-board, or output the lexical representation for processing by a personal computer or other machine. Examples of image capture devices 210 include, without limitation, digital cameras, all-in-one machines, scanners, camera-equipped cell phones, and personal digital assistants.

Reference is once again made to FIG. 2b, which illustrates a machine 230 such as a personal computer, laptop, or Internet appliance. The machine 230 may access a numeric representation of a digital image by reading it from memory 234 or receiving it via a transmission path (e.g., a LAN, the Internet). For instance, a personal computer can access a numeric representation from a hard drive, network interface or peripheral device, convert the image to a lexical representation, process the lexical representation, and then store, display or transmit the results of the processing. For example, the results may be displayed using an image rendering device 240.

Reference is once again made to FIG. 2c, which illustrates an image rendering device 250 such as a printer, all-in-one machine, digital television or video display. An image rendering device 250 such as a digital television can access a numeric representation (of a test pattern, for example) from a cable box or computer, convert the image to a lexical representation, process the lexical representation, and use or store the processing to adjust its rendering engine 258.

The invention claimed is:

1. A method of processing a digital image, the method comprising:
   using a machine to convert numerical representations of colors in the digital image to lexical representations of the colors using a color naming database generated by a plurality of participants, wherein generating the color naming database further comprises:
   accessing a set of the numerical representations of colors in the digital image;
   using an image rendering device to display the set of colors associated with the set of numerical representations;
   allowing an observer to name the displayed colors;
   assigning names for the displayed colors with the image rendering device; and
   comparing the observer-generated names to the names generated by the image rendering device.

2. The method of claim 1, further comprising identifying mismatched color names wherein the observer-generated names are different from the names generated by the image rendering device.

3. The method of claim 2, further comprising performing a color correction of the mismatched color names generated by the image rendering device.

4. A method of processing a digital image, the method comprising:
   using a machine to convert numerical representations of colors in the digital image to lexical representations of the colors using an unconstrained color naming database generated by a plurality of participants;
   generating a color assignment map of N color values to M color values, where N>M; and
   defining fuzzy memberships that encompass numeric values.

5. The method of claim 4, wherein generating the map includes selecting a group of color names and corresponding numeric representations;
   generating histograms from components of the numeric representations; and using the histograms to create a multivariate set of membership functions for the colors.

6. The method of claim 5, wherein the group of color names is selected from a random sampling of at least several thousand people.

7. The method of claim 6, wherein image processing is performed on a raw image to form a processed image; wherein the machine is used to name colors in the processed and raw image; and wherein the named colors in the processed and raw image are compared.

8. The method of claim 7, wherein the comparisons indicate boundary crossings, the method further comprising keeping track of the locations of boundary crossings.

9. The method of claim 8, wherein track is also kept of the number of boundaries crossed at each location.

10. The method of claim 8, further comprising preparing statistics of the boundary crossings.

11. The method of claim 10, wherein the statistics are used to analyze a color table.

12. A method of developing an image processing pipeline, the method comprising using a pipeline to process a raw image, the pipeline including a family of image processing algorithms; using the method of claim 10 to compare named colors in the raw and processed images; and, evaluating the pipeline according to the comparison.

13. The method of claim 7, further comprising generating a lexical warning image from the comparisons.

14. The method of claim 4, further comprising using the lexical representations in color reproduction to perform color correction in an image rendering device, wherein using the lexical representations includes:
    accessing a set of numeric representations of different colors;
    using the image rendering device to display the colors in the set;
    allowing an observer to name the displayed colors;
    assigning color names to the numeric representations of the displayed colors; and
    comparing the observer-generated names to the device-generated names.

15. The method of claim 14 further comprising identifying those color names that mismatch.

16. The method of claim 15, further comprising using the mismatches to apply the color correction.

* * * * *

UNITED STATES PATENT AND TRADEMARK OFFICE
CERTIFICATE OF CORRECTION

| | | |
|---|---|---|
| PATENT NO. | : 9,047,804 B1 | Page 1 of 1 |
| APPLICATION NO. | : 11/615035 | |
| DATED | : June 2, 2015 | |
| INVENTOR(S) | : Nathan M. Moroney et al. | |

It is certified that error appears in the above-identified patent and that said Letters Patent is hereby corrected as shown below:

In the Drawings

In sheet 9 of 9, reference numeral 820, line 3, delete "ENHANCEDIMAGES" and insert -- ENHANCED IMAGES --, therefor.

Signed and Sealed this
Eighth Day of December, 2015

Michelle K. Lee
*Director of the United States Patent and Trademark Office*